United States Patent
Hu et al.

(10) Patent No.: US 7,878,572 B2
(45) Date of Patent: Feb. 1, 2011

(54) TONNEAU COVER

(75) Inventors: Yachun Hu, Shanghai (CN); Shaobo Hu, Shanghai (CN)

(73) Assignee: Jiuda Vehicle Fittings-making (Shanghai) Co., Ltd., Zhonggu Town, Qingpu District, Shanghai (CN)

( * ) Notice: Subject to any disclaimer, the term of this patent is extended or adjusted under 35 U.S.C. 154(b) by 157 days.

(21) Appl. No.: 12/271,875

(22) Filed: Nov. 15, 2008

(65) Prior Publication Data
US 2010/0019528 A1    Jan. 28, 2010

(30) Foreign Application Priority Data
Jul. 24, 2008    (CN)    ............... 2008 2 0121935 U

(51) Int. Cl.
*B60P 7/02*    (2006.01)
(52) U.S. Cl. ............................. 296/100.02; 296/100.06
(58) Field of Classification Search ............ 296/100.02, 296/100.06, 100.07, 100.08, 100.1, 136.03
See application file for complete search history.

(56) References Cited

U.S. PATENT DOCUMENTS

| | | | | |
|---|---|---|---|---|
| 4,261,611 A * | 4/1981 | Barry et al. | ............... | 296/100.1 |
| 6,221,290 B1 * | 4/2001 | Waddington et al. | ........ | 264/45.3 |
| 6,547,310 B2 * | 4/2003 | Myers | .................... | 296/100.02 |
| 6,641,201 B1 * | 11/2003 | Pietryga et al. | .......... | 296/100.1 |
| 6,712,418 B1 * | 3/2004 | Lathers | .................. | 296/100.02 |
| 6,896,313 B2 * | 5/2005 | Mack et al. | ............ | 296/100.08 |
| 7,318,618 B1 * | 1/2008 | Yue | ........................ | 296/100.06 |
| 7,588,283 B2 * | 9/2009 | Zajicek et al. | ......... | 296/100.02 |
| 2001/0038225 A1 * | 11/2001 | Muirhead | .............. | 296/100.06 |
| 2006/0108826 A1 * | 5/2006 | McClure et al. | ........ | 296/100.07 |
| 2007/0257507 A1 * | 11/2007 | Hobrecht | ............... | 296/100.08 |

* cited by examiner

*Primary Examiner*—Jason S Morrow
(74) *Attorney, Agent, or Firm*—Global IP Services; Tianhua Gu

(57) ABSTRACT

The invention belongs to the field of automobile parts, in particular, to a tonneau cover installed on the notchback (pickup) for covering and closing the rear truck bed. The tonneau covers of current vehicles are either too thick or heavy so it influences the flexibility of opening and closing and its requirements to the actuating mechanism are high; its thickness is large; and it occupies more of the already limited room of rear truck bed. This invention provides a truck bed back cover which occupies less rear truck bed room and is strong in strength, flexible in opening and closing and excellent in operating performance. It consists of the cover plate body which matches with the rear truck bed and is made of base materials. The base material is glass fiber reinforced polyurethane. The cover plate body is provided with an integral structure framework. The framework makes the cover plate body form protruding arises on the surface of the side facing to the truck bed. Taking the built-in integral structure framework as support, the tonneau cover is cast with glass fiber reinforced polyurethane. It has enough strength and is small in size and light in weight, thus it occupies a small room of the rear truck bed. Since it is light in weight, the opening and closing of cover plate is flexible and the operation is convenient.

11 Claims, 2 Drawing Sheets

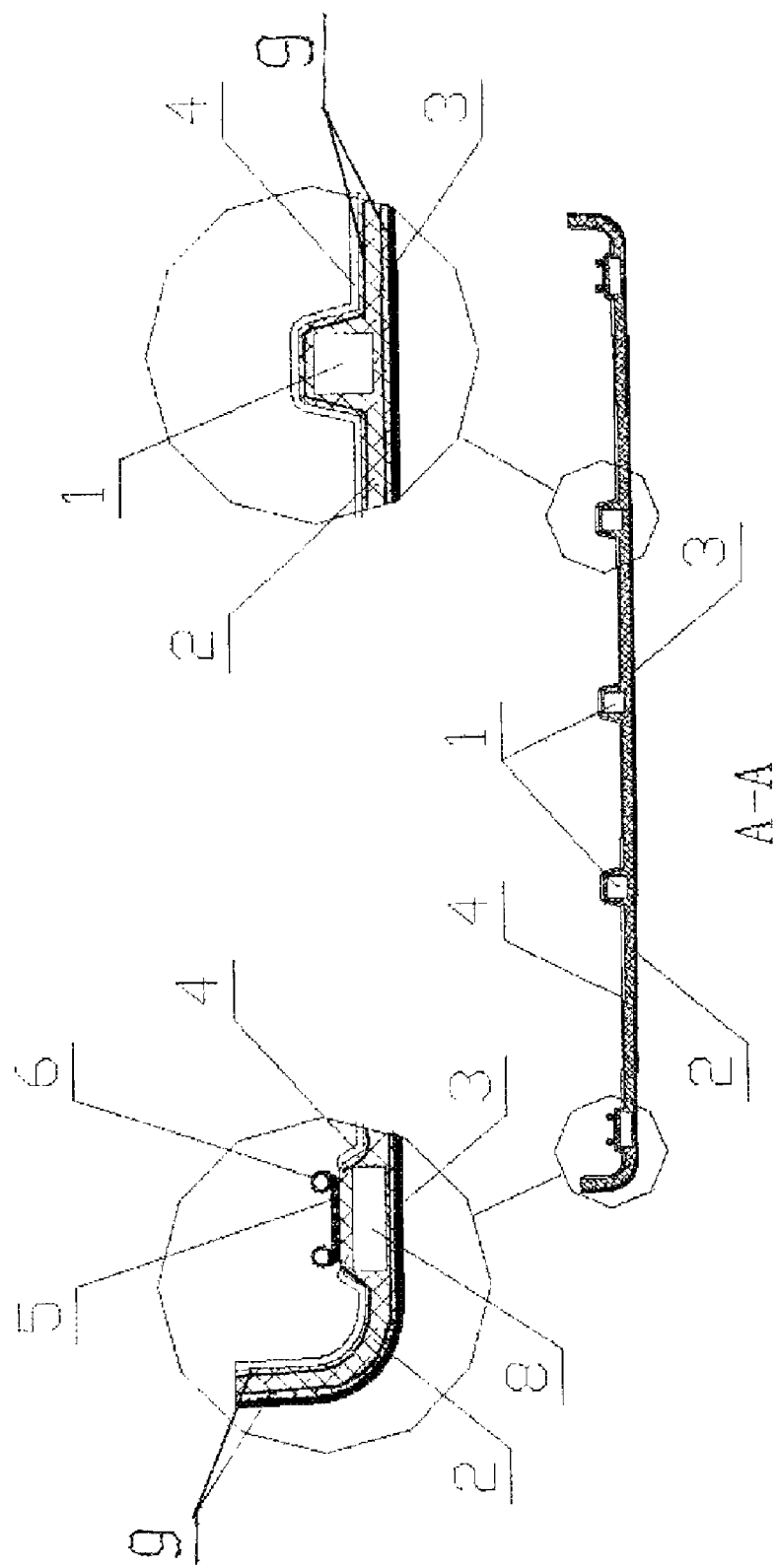

TONNEAU COVER

CROSS REFERENCE TO RELATED PATENT APPLICATION

This patent application claims the priority of the Chinese patent application No. 200820121935.5, filed on Jul. 24, 2008, which application is incorporated herein by reference.

FIELD OF THE INVENTION

The invention belongs to the field of automobile parts, in particular, to a tonneau cover installed on the notchback (pickup) for covering and closing the rear truck bed.

BACKGROUND OF THE INVENTION

The common notchbacks have open rear truck beds which have a poor protection for shipments. During transportation, goods would be damaged or contaminated by dust due to wind and rain. When running under poor road conditions, the goods tend to be tossed and fall out due to jolt. And when parking, the goods in the rear truck bed with an open structure are easier stolen or lost. With regard to this, people install a movable cover plate to cover and close the rear truck bed, and remove the cover plate only when the goods are comparatively high. Existing cover plates that are made of resin for glass fiber reinforced plastic or thermoplastic plastics are very inconvenient for use, wherein the cover plate made of glass fiber reinforced plastic resin must have a certain thickness to ensure sufficient strength. If the cover is too thick and heavy, it will affect the opening-closing flexibility and have a high requirement to the actuating mechanism. The cover plate made of thermoplastic plastic has a hollow structure, but the thickness of the cover is large and it occupies too much room of the rear truck bed.

SUMMARY OF THE INVENTION

The technical problems to be solved and technical task raised by the invention are to overcome the technical deficiencies of the existing cover plates to provide a new tonneau cover. The new tonneau cover is very thin and light, but has good strength and takes up less room of the rear truck bed. The cover plate is flexible in opening-closing operation with a good operating performance.

The technical scheme of the invention is: A tonneau cover, consisting of a cover plate body made of base material that matches with the rear truck bed, is characterized in that: the base material is of glass fiber reinforced polyurethane, an integral structure framework is equipped in the cover plate body, and the framework makes the cover plate body form protruding arrises on the surface of the side facing to the truck bed. Taking the built-in integral structure framework as support, the tonneau cover is cast with glass fiber reinforced polyurethane. It has enough strength and is small in size and light in weight, thus it occupies a small room of the rear truck bed. Since it is light in weight, the opening and closing of cover plate is flexible and the operation is convenient.

The integral structure framework is "#" shaped, vertically cross-connected and formed by two groups of brackets which are vertically and horizontally arranged respectively. The corresponding protruding arrises are arranged in the shape of "#". The "#" shaped framework, vertically cross-connected and formed by two groups of brackets which are vertically and horizontally arranged respectively, has a simple structure and good integral supporting strength for the cover plate.

The brackets of the invention are hollow tubes. Ensuring sufficient strength of the framework, the hollow tube could further reduce the weight, make the cover plate of truck bed lighter, and improve flexibility of opening and closing. The framework could be made of metal or plastic tubes in accordance with actual demands.

The cover plate body of the invention is made of base materials, of which the both faces are covered by dense layers made of resin after being treated. The functions of dense layers are to improve the surface strength and flatness of the cover plate, eliminate the adverse impact brought by pores that are produced by pouring the glass fiber reinforced polyurethane, enhance waterproofness and wearing resistance, and prolong the service life of the tonneau cover. The dense layer could be made of putty resin or other materials that have the equivalent effect.

The cover plate body of the invention is covered by a coating layer on the dense layer surface of the side backing toward the truck bed. The function of coating layers is to prevent the cover plate's side which is outward from being influenced by external conditions such as radiation of sunshine, temperature changes, and wind and rain, so as to avoid a series aging phenomena such as fading, discoloration, cracks, pulverization and strength decreases, and consequently increase the effective service cycle of the cover plate. In addition, customers can also select the colors of the paints according to their own fondness to improve the integral beauty of the vehicles.

The surface of the dense layer at the side of cover plate body of the invention facing to the truck bed is covered by flexible buffer layer or the coating layer. The flexible buffer layer could avoid the direct rigid collisions between cover plate and goods when being opened and closed, so that the cover plate and goods would not be damaged by collision. The flexible buffer layer could be made of high-velvet decorative cloth or other decorative fabrics with the equivalent properties. The inside surface of the truck cover would be more beautiful after being covered by The coating layer could improve the wearing resistance of the surface of truck cover that contacts with the goods and prolong the service life of the cover plate. The cloth or coating could be selected in accordance with customers' requirements.

The surface of the cover plate body of the invention which faces to the truck bed is equipped with sealed quadrilateral limit arrises that correspond to the edges of the rear truck bed. The limit arrises are arranged around and connect with the protruding arrises that are arranged in #-shape. The cover plate body in the location of the limit arrises is arranged with a connecting rod inside. The connecting rod is fixed by connecting with integral framework. When the tonneau cover is closed, the quadrilateral limit arrises correspond with and contact with the edge of the rear truck bed so as to resist shock and make the cover plate more durable. The connecting rod strengthens and supports the limit arrises. The connecting rod could be made of wooden bar or other light materials.

The surfaces of the limit arrises of the invention have sealing strips along the length direction. The function of the sealing strips is to strengthen the sealing effects of the contact surface between the cover plate and rear truck bed, thus the rear truck bed can have better rain proof effect after the closing of the cover. During the closing and opening movement of cover, the sealing strip is also able to play the function of buffering and damping so as to reduce the working noise.

The two sides of the sealing strips of this invention are provided with inturned curling. When the tonneau cover is closed, the inturned curling is able to improve the tightness when the sealing strips are contacting with the rear truck bed, so the waterproof and dustproof properties will be better.

This invention adopts the preplaced integral structure framework which is formed by the square crossing hollow tube bracket as the support. In comparison with current tonneau cover plate without inner supporting bracket, its material consumption is lower when pouring and it is full of legerity, light in weight and strong in strength. The operation of the cover plate is convenient in use and flexible in opening and closing. It is able to meet the requirements of long-term services of the vehicles.

BRIEF DESCRIPTION OF THE DRAWINGS

FIG. 2: Sectional View of FIG. 1 at A-A direction.
In the drawings: 1. Bracket, 2. Base Material, 3. Coating Layer, 4. Flexible Buffer Layer, 5. Sealing Strip, 6. Curling, 7. Protruding Arris 8. Connecting Rod

DETAIL DESCRIPTION OF THE INVENTION

Figure 1:
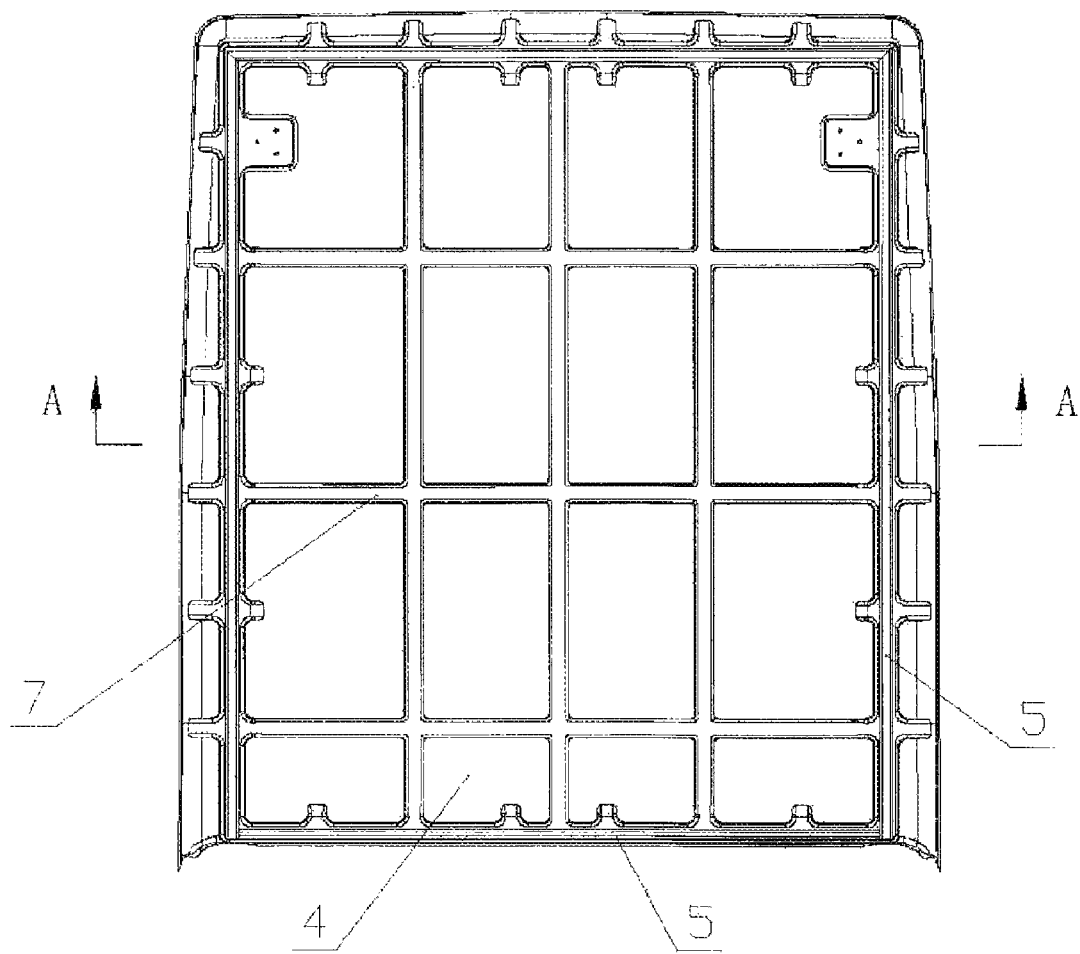
FIG. 1: Schematic diagram of the tonneau cover of this invention.

In combination with the description of the drawings and mode of carrying out the utility mode, further description of the invention will be given below.

As shown in FIG. 1-2, tonneau cover, comprising a cover plate body, matches with the rear truck bed and is made of the base materials 2. The base material is of glass fiber reinforced polyurethane and an integral structure framework is equipped in the cover plate body. The integral structure framework is "#" shaped, vertically cross-connected and formed by two groups of brackets which are vertically and horizontally arranged respectively. Bracket 1 is hollow tube and the framework also makes the cover plate body form protruding arrises 7 in line of "#" shape on the surface of the side facing to the truck bed. The surface of the cover plate body facing to the truck bed is equipped with closed quadrangular limit arrises corresponding to the rear truck bed edges. The limit arrises are arranged around and connected with the #-shape arranged protruding arrises. The cover plate body where the limit arrises are located is provided with a connecting rod 8 which is in fixed joint with the integral structure framework; the cover plate body formed by the base material 2 is covered by dense layers formed through treatment of resin (9) on both sides. The dense layer on the side of the cover plate body which is the in opposite direction of the truck bed is covered with coating layer (3) and the other side of the dense layer is covered by flexible buffer layer 4 (made of high cashmere ornamental cloth). Therein, the surfaces of limit arrises have no flexible buffer layer but being labeled with sealing strips 5 directly. The two sides of the sealing strips of this invention are provided with inturned curling 6. When using, the ornamental cloth side of the tonneau cover faces to the truck bed while coating layer side faces to outside and covers the rear truck bed. The sealing strip closely contacts with the corresponding contacting surface of the edge of the truck bed so the cover and closing to the rear truck bed by the cover plate is achieved.

What is claimed is:

1. A tonneau cover comprising:
    a cover plate body made of base material, the cover plate matches with a rear truck bed;
    the base material is glass fiber reinforced polyurethane;
    the cover plate body is provided with an integral structure framework, the framework makes the cover plate body to form protruding arrises on a back surface facing to the rear truck bed;
    the integral structure framework is formed by two groups of parallel brackets cross-connected vertically, the protruding arrises are arranged in a plurality of "#" shapes.
2. The tonneau of claim 1, wherein the brackets are composed of hollow tubes.
3. The tonneau cover of claim 1, wherein the cover plate body is covered by a resin layer formed through treatment of resin on both sides.
4. The tonneau cover of claim 2, wherein the cover plate body is covered by a resin layer formed through treatment of resin on both sides.
5. The tonneau of claim 3, wherein the resin layer on an upper surface facing outside of the cover plate body is covered with a coating layer.
6. The tonneau cover of claim 4, wherein the resin layer on an upper surface facing outside of the cover plate body is covered with a coating layer.
7. The tonneau cover of claim 3, wherein the resin layer on the back surface of the cover plate body is covered by a flexible buffer layer or a coating layer.
8. The tonneau cover of claim 4, wherein the resin layer on the back surface of the cover plate body is covered by a flexible buffer layer or a coating layer.
9. The tonneau cover of claim 1, wherein the back surface of the cover plate body is equipped with closed quadrangular limit arrises corresponding to rear truck bed edges, the limit arrises are arranged around and connected with the #-shape arranged protruding arrises, the cover plate body where the limit arrises are located are provided with connecting rods which are in fixed joint with the integral structure framework.
10. The tonneau cover of claim 9, wherein surfaces of the limit arrises are stuck by sealing strips in a direction of the length of the arris.
11. The tonneau cover of claim 10, wherein each sealing strip is provided with inturned curling.

* * * * *